Dec. 28, 1943.  C. W. MOTT  2,337,764
POWER LIFT MECHANISM
Filed Oct. 2, 1941  6 Sheets-Sheet 1

Fig. 1.

Inventor:
Carl W. Mott.
By Paul O. Pippel
Atty.

Fig. 2

Dec. 28, 1943.  C. W. MOTT  2,337,764
POWER LIFT MECHANISM
Filed Oct. 2, 1941  6 Sheets-Sheet 4

Inventor:
Carl W. Mott.
By Paul C. Pippel
Atty.

Dec. 28, 1943.    C. W. MOTT    2,337,764
POWER LIFT MECHANISM
Filed Oct. 2, 1941    6 Sheets-Sheet 5

Inventor:
Carl W. Mott.
By Pierce C. Pippel
Atty.

Dec. 28, 1943. C. W. MOTT 2,337,764
POWER LIFT MECHANISM
Filed Oct. 2, 1941 6 Sheets-Sheet 6

Inventor:
Carl W. Mott,
By Paul O. Pippel
Attys.

Patented Dec. 28, 1943

2,337,764

UNITED STATES PATENT OFFICE 2,337,764

POWER LIFT MECHANISM

Carl W. Mott, La Grange, Ill., assignor to International Harvester Company, a corporation of New Jersey Application October 2, 1941, Serial No. 413,293

9 Claims. (Cl. 97—50)

This invention relates to tractor-mounted implements and more particularly to power means for moving the working tools thereof to and from their working position and to means for adapting the power means so that it may be adapted for the adjustment by power of the working tools in their working position. Part of the subject matter herein disclosed is claimed in copending application, Serial No. 492,859, filed June 30, 1943, for Selective valve mechanism, which is a division of the present application.

It is an object of the invention to provide a power control unit adapted to be located on a tractor near to the operator's station and to have a single manually operable control element by which the operator may cause movement of the working tools located at opposite sides of the tractor either collectively or selectively.

It is another object of the invention to provide with a combined collective and selective control mechanism means accessible to the operator and easily operable, whereby the power mechanism may be made adaptable for adjusting the working tools by power in their working position, such as when it is desired to change the working depth of ground-working tools.

It is another object of the invention to provide a combined collective and selective control unit, which can be connected to the tractor as a unit and one which is adapted for use with a tractor already having a power mechanism, whereby the said original power mechanism can be readily converted into a power mechanism having collective and selective control.

It is still another object of the invention to provide in a fluid valve control unit for fluid power mechanisms a simplified arrangement of fluid valves and of the means for operating the same.

According to the present invention, there has been provided a collective and selective control unit which is adapted to be attached to the tractor at a location near the operator's station and which has a single operable control element which the operator operates to cause either collective operation of working tools disposed at opposite sides of the tractor or selective operation of the working tools at one side of the tractor independently of the operation of the working tools at the opposite side of the tractor. The operator, by the single control element, may cause both raising and lowering of the working tools on both sides of the tractor or on one side of the tractor independently of the working tools on the other side of the tractor. This combined unit is of such construction that it can be readily connected with the manual control valve mechanism of a fluid power mechanism already in use upon the tractor and serving only for simultaneously lifting the working tools on opposite sides of the tractor. In addition to the fluid connections being made with the main control valve unit, the manually operable control element is connected directly with the control element of the main control valve mechanism. Through this connection the throwout mechanism, already provided for in the usual power mechanism, acts upon the manually operable control element of the combined unit to thereby return the element from a position where it maintains the valves associated therewith in an open position to a neutral position where the valves are closed. This combined unit comprises generally a housing in which there is a pair of fluid passages in each of which the fluid is adapted to be controlled by a valve arrangement. Each valve arrangement has an operating arm means projected into a central location where the same may be actuated by a single common control element. This control element may be manipulated to act upon the projected arm of one independently of the other or upon both simultaneously. Also associated with the housing is a throttle valve serving to reduce the flow of fluid through the unit. When the operator desires to make use of the power mechanism for the adjustment of the working tools, the throttle valve is thrown to a throttle position and the adjustment is made by power. The means for operating each of the valves includes an axially rotatable spindle having a recess into which there is fitted a ball element. As the spindle is rotated, the ball element bearing on the walls of the fluid passage is caused to be lifted out of the recess of the rotatable spindle and caused to engage with the valve element to lift the same from its seat. This same operating means is fixed to the housing by a threaded portion thereon seated in a threaded recess in the housing but permited to turn therein.

For other objects and for a better understanding of the invetnion reference may be had to the following detailed description taken in connection with the accompanying drawings, in which.

Figure 1:
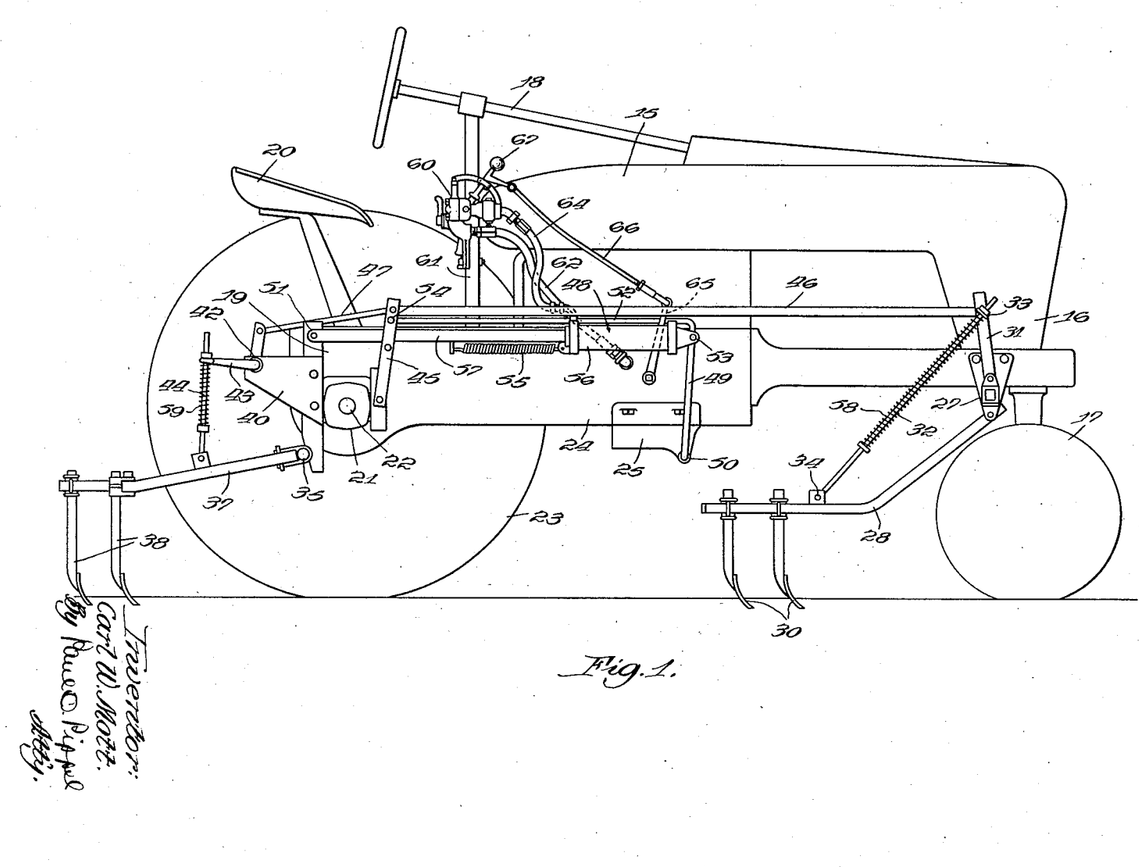
Figure 1 is an elevational view of the tractor and of the working tools located at one side thereof with the combined selective and collective unit mounted at a location accessible to the operator's station on the tractor.
Figure 2:
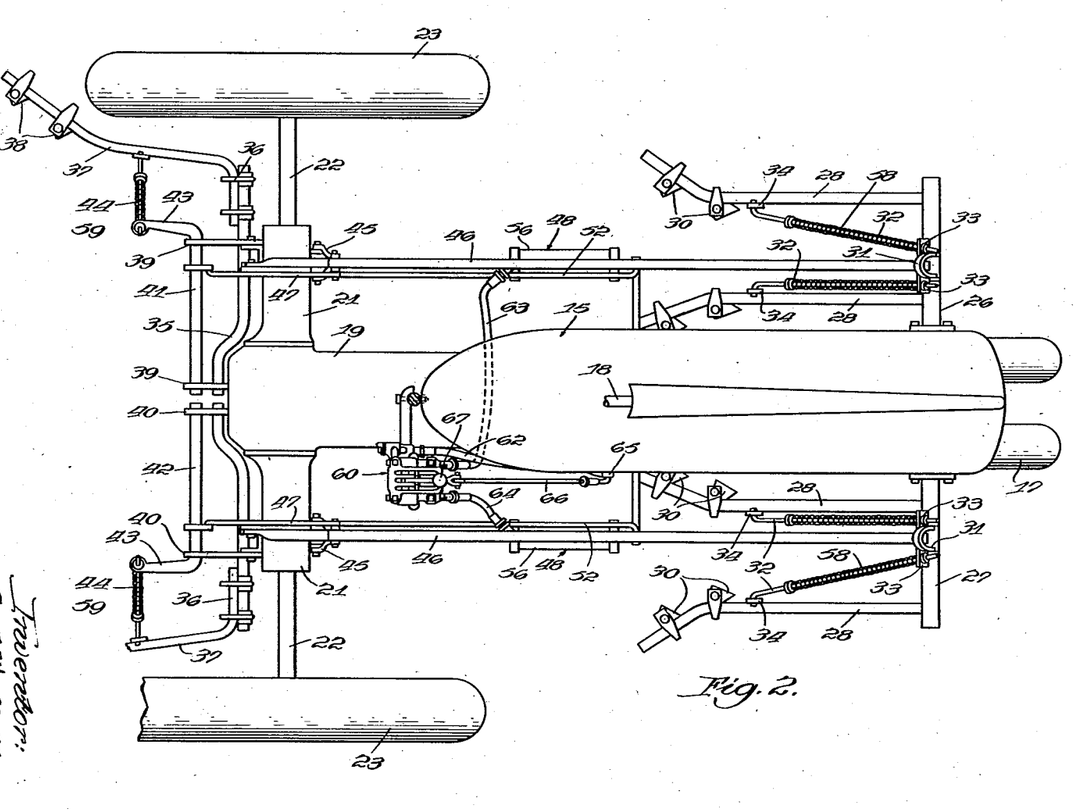
Figure 2 is a plan view of the tractor and of working tools located at opposite sides of the same and of the power actuating means and its accompanying control mechanism.

Referring now particularly to Figures 1 and 2, there is shown generally a tractor 15 having a forward portion 16 supported on a dirigible wheel structure 17 adapted to be operated by a steering mechanism 18 from a rear portion 19 of the tractor and near to an operator's station 20 thereon. The rear portion of the tractor includes a transversely extending axle structure 21 through which there extends rear axles 22 having respectively mounted thereon tractor drive wheels 23 serving to support the rear portion of the tractor. Intermediate the forward and rearward portion of the tractor, there is provided a body portion 24 into which there is inserted a fluid power mechanism 25, as shown more clearly in Figures 3 and 4. This fluid power mechanism 25 forms a part of a fluid power arrangement already in use for delivering fluid to a pair of fluid-actuated cylinders normally located at opposite sides of the tractor for lifting respectively of working tools likewise located at opposite sides of the tractor. A more complete description of this fluid power mechanism 25 will be made hereinafter.

Mounted on the forward portion 16 of the tractor and extending respectively from opposite sides thereof are the brackets 26 and 27. Each of these brackets have pivotally connected to the same a pair of working-tool rigs 28 having working tools 30 thereon. Likewise, on each of the brackets 26 and 27 there is pivoted a lifting lever 31 having a free end to which is connected lift rods 32 as shown at 33. These lifting rods are connected at their lower end to the working-tool rigs 28, as shown at 34. As the lifting lever 31 is rotated in a clockwise direction, the working-tool rigs will be similarly rotated and lifted out of their ground position.

Mounted on the rear portion of the tractor is a transversely extending bracket member 35 which extends substantially the entire width of the tractor. To the outer ends of this bracket member 35 there is respectively positioned pivotally connected, in a manner indicated at 36, working-tool rigs 37 having working tools 38 thereon. The working tools 38 are so positioned as to follow the tractor drive wheels 23. Immediately above the transversely extending bracket 35 on the rear portion of the tractor, there is provided two pairs of rearwardly extending brackets 39 and 40 serving to respectively support rock-shafts 41 and 42. Each of these rock-shafts has a lift arm 43 connected respectively to a rear rig 37 by means of a lift rod 44. As each rock-shaft is rotated, the rear rig will be likewise rotated in the same direction. Mounted on each laterally extending rear axle housing 21 is a pivoted lever 45, the free end of which is respectively connected with the pivoted lever 37 at the forward portion of the tractor by means of a longitudinally extending lifting rod or pipe 46 and to the respective rock-shaft by means of a rod 47. Since the forward and rearward rigs are interconnected, it will be apparent that movement of the lift pipe 46 will cause simultaneous movement of all the working tools at one side of the tractor. The working-tool rigs are at the opposite side of the tractor and similarly connected, and movement of the lifting pipe on that side of the tractor will likewise cause simultaneous movement of the working-tool rigs at that side of the tractor.

Associated with the fluid power arrangement commonly used, there is in addition to the fluid power mechanism 25, a pair of fluid-actuated devices 48 located respectively at opposite sides of the tractor. Each device is supported at its forward end by means of a vertically extending supporting link 49 pivoted in the fluid mechanism 25, as indicated at 50. The rearward end of the fluid-actuated device 48 is anchored against the rear portion of the tractor, as indicated at 51. As fluid is delivered under pressure to the fluid-actuated device, the same elongates and by means of a link 52 connected with the forward end of the fluid device 48, as indicated at 53, and with the rear lever 45, as indicated at 54, this elongation is imparted to the rear lever 45. The lifting pipe 46 is consequently thrust forwardly, and the levers 31 and 45 are rotated in clockwise direction to thereby cause lifting movement of the working-tool rigs located respectively at the forward and rearward portions of the tractor. As a means for keeping the fluid-actuated device in a collapsed and unextended position, there is provided a spring 55 connected between its relatively movable parts 56 and 57 of the fluid-actuated device 48. By the use of this spring 55, the usual pressure springs 58 and 59, located respectively on the lift rods 32 and 44, will be effective to hold the working tools in their ground-working position.

According to the present invention, means is provided for converting the usual power arrangement into an arrangement whereby collective or selective operation of the working tools on the respective sides of the tractor can be effected. As a means for obtaining this effect, there is provided a combined selective and collective control mechanism 60 adapted to be connected to a steering mechanism support 61 for the steering mechanism 18 and accessible to the operator's station 20. This mechanism is such that fluid is delivered from the fluid power housing 25 through a fluid communication 62 and delivered respectively to the fluid-actuated devices 48 at the opposite sides of the tractor by means of fluid communications 63 and 64. The fluid power mechanism 25 has its usual manually controllable element 65 which is in turn connected by means of an adjustable connecting rod 66 to a manually operable control element 67 forming a part of the unit mechanism 60.

Figure 3:
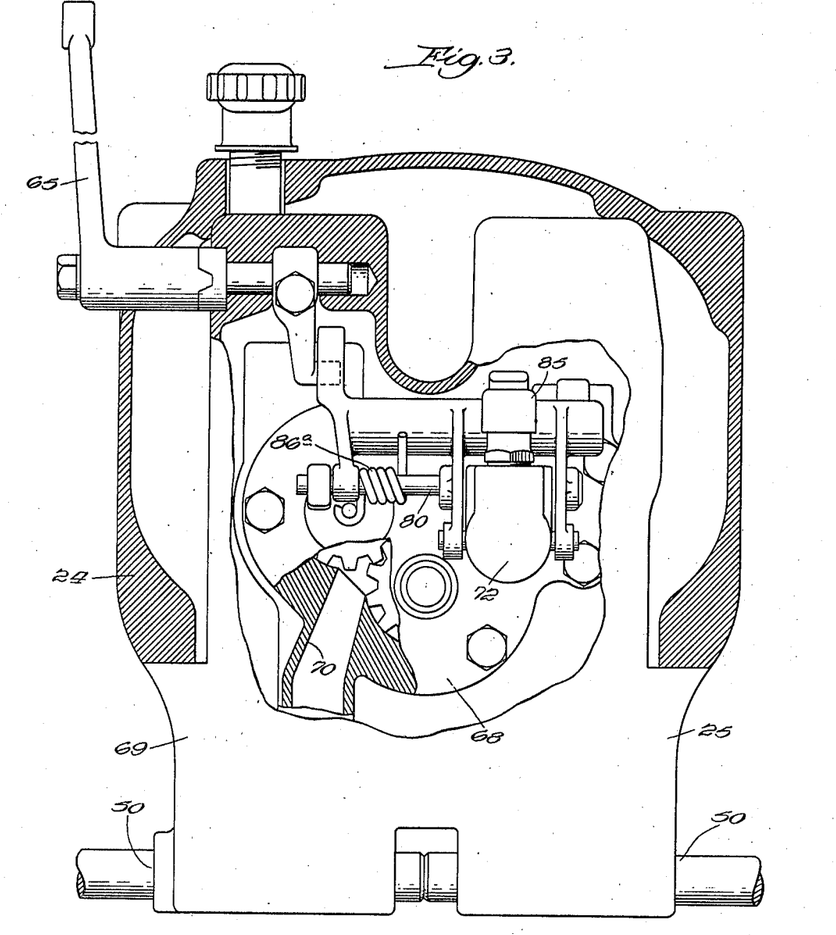
Figure 3 is a detail view of the main control valve mechanism fitted within the body of the tractor.
Figure 4:
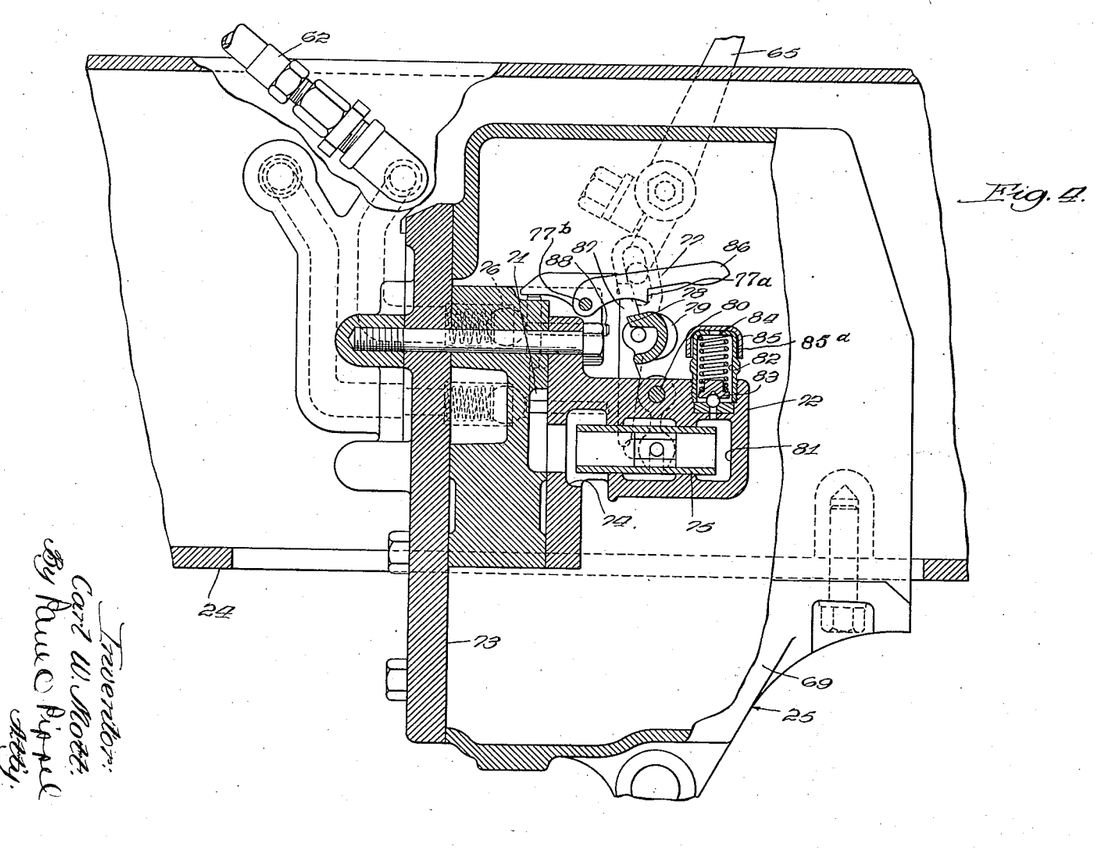
Figure 4 is a side elevational view, partly in section, of the main control valve mechanism shown in Figure 3.

Referring now particularly to Figures 3 and 4, a brief description will now be made of the fluid power mechanism 25, all of which is shown in the pending application of the present inventor, Serial No. 326,059, filed March 26, 1940. Generally, this fluid power mechanism includes a gear pump 68 having a shaft adapted to be driven by the tractor power plant. This pump 68 receives fluid from a fluid housing 69 through an inlet 70 and delivers the same to a passage 71 formed in the valve control housing 72 adapted to be supported by the pump housing 68, the latter being in turn connected to a plate 73 forming a part of the reservoir housing 69. Normally fluid from the passage 71 is returned to the reservoir through a return port 74 in the valve housing. This port 74 is controlled by a sleeve valve 75, and when it is desired to deliver fluid to a fluid-actuated device, this sleeve valve is operated by means of a manual control lever 65 to close the port 74, thereby causing fluid from the passage 71 to be delivered past a ball valve 76 to the fluid communication 62. The sleeve valve 75 is ordinarily locked in its closing position by a latch element 77 adapted to cooperate with a portion 78 on the sleeve valve operating arm 79 pivoted to the valve housing 72, as indicated at 80. Since, when the sleeve valve 75 is closed fluid is no longer admitted from the port 74, the same will pass through the sleeve 75 into a chamber 81 which in turn communicates with a chamber 82, the flow to this chamber 82 being controlled by a pressure biased ball valve 83. When the working-tool rig has been raised to its transport position, pressure is sufficient to cause fluid to pass the ball valve 83 and thence through an opening 84 causing a tightly fitted top 85 on the chamber 82 to be projected for contact with the outer end 86 of the latch element 77. This force is sufficient to unlatch the latch member 77 from the portion 78 of the lever 79. As this unlatching is effected, the coil spring 86a, Figure 3, will cause the shaft 80 to rotate in a counter-clockwise direction, as viewed in Figure 4, to thereby cause return movement of the sleeve 85, and fluid in the fluid-actuated device will be retained by means of the ball valve 76.

When it is desired to lower the working-tool rig, the lever 65 is operated in a clockwise direction to cause an element 87, carried by the operating lever 79, to bear against a pin 88 which will unseat the ball valve 76 to thereby permit return of the fluid from the fluid-actuated device through the chamber 71 and the by-pass port 74 to the reservoir. It should now be apparent that there is provided with this fluid power mechanism 25 a throw-out mechanism for automatically throwing out the sleeve valve 75 to permit by-pass of the fluid being drawn from the fluid reservoir by the pump 68. Thus, the control lever 65, when normally moved in a counter-clockwise direction to effect lifting of the working tools, is automatically returned to a neutral position and in a clockwise direction upon the throw-out mechanism being operated at the end of the working stroke of the fluid-actuated device.

It should be noted, however, that the latch face 77a of the lever 77 is at such an angle with respect to a radius line intersecting the same and the pivot support 77b for said lever that a manual force applied to the lever 65 for supplementing the force of the spring 86a will cause the faces 78 and 77a to cam the lever 77 upwardly and thus forcibly unlatch this latch lever incident to moving the by-pass valve sleeve to its open position. In this manner, the delivery of the pump to the tool-raising motors 48 can be interrupted at will, so that the tools can be raised for depth adjustment as well as to the transport position at which there is automatic unlatching of the lever 77 by the cap 85 on the pressure release or pop-off ball valve 83, as described above.

Referring now particularly to Figures 5 to 11, inclusive, there is shown in detail the combined collective and selective unit 60 used in the carrying out of the present invention. Once the fluid is delivered from the fluid reservoir housing 25 through the communication 62 it enters a housing 90 having a laterally extending communicating portion 91 from which the fluid is distributed to a pair of forwardly extending fluid passages 92 and 93. These fluid passages 92 and 93 are laterally spaced with respect to each other and each of which has a valve arrangement and its associated operating means. The fluid communications 63 and 64 are respectively connected with the fluid communications 92 and 93 of the fluid housing 90.

Figure 5:
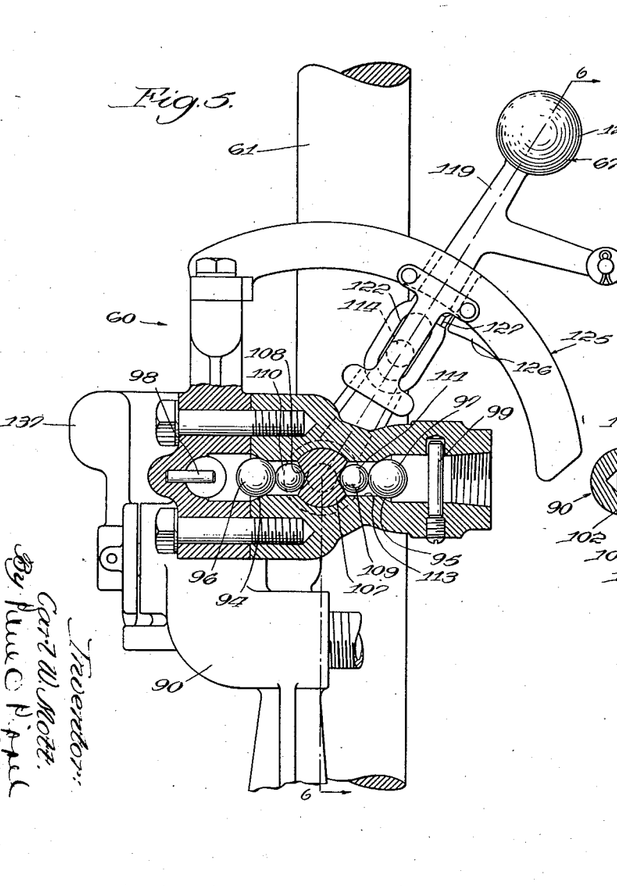
Figure 5 is a view in elevation and partly in section of the combined collective and selective valve control unit.

Each of the fluid passages 92 and 93 have opposite valve seats 94 and 95 against which there is seated respectively the ball valves 96 and 97. These ball valves are normally held against the valve seats by fluid pressure acting on the same. They are limited respectively in their movement in the passages by retaining pins 98 and 99.

Figure 6:
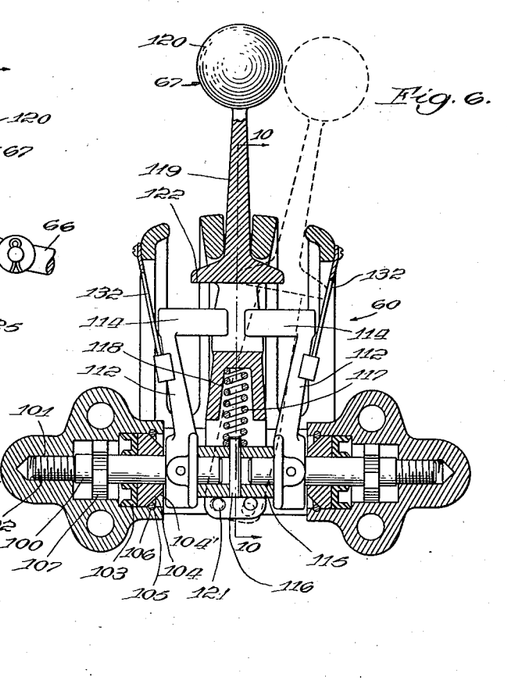
Figure 6 is a view taken in elevation of this combined unit along the line 6—6 of Figure 5.
Figure 7:
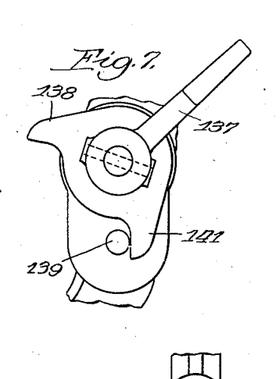
Figure 7 is a view in elevation of the throttle control valve operating mechanism.
Figure 8:
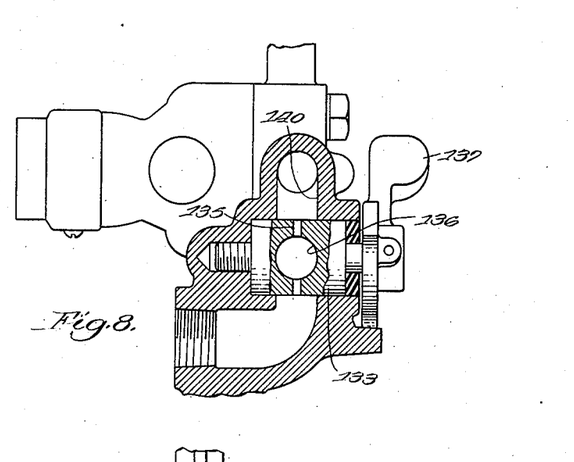
Figure 8 is a view of the unit showing in longitudinal section the throttle valve control.

Extending laterally into the fluid passages, there is an axially rotatable spindle member 100 having a threaded portion 101 adapted to be threaded into a threaded recess 102 formed in the housing 90 (see Figure 6). By so threading the rotatable spindle 100 into the recess 102, the member is retained against axial movement and at the same time is permitted to rotate about its axis. Once the rotatable member is inserted, it is sealed by means of a sealing ring 103 which is retained in its position by a washer 104 and a snap ring 105 for retaining the washer. The washer 104 has a conical surface 104' which bears against the snap ring 105. By having this surface of conical shape, the force so acts upon the snap ring 105 as to force the same into a recess 106 formed in the housing for receiving the same rather than tending, as in the case of a flat washer, to disconnect the snap ring from its recess 106. The rotatable member 100 has an operating portion 107. This operating portion has countersunk recesses 108 and 109 drilled into the same. These recesses are of sufficient depth to have fitted therein a part of balls 110 and 111. These balls 110 and 111 are fitted within the fluid communication and in alinement with the recesses. On the rotatable member 100, there is an operating arm 112. When this operating arm 112 is operated by means to be hereinafter described, the balls 110 and 111 are caused to move axially through the fluid communication 93 due to confinement by the wall of the fluid passage into engagement, respectively, with the ball valves 96 and 97. In this manner the ball valves 96 and 97 become unseated, and fluid, which is delivered to the housing 90 through the communication 62, will pass to the fluid communication 64. By having a pair of opposite ball valves 96 and 97 fluid is not permitted to remain under pressure in an intermediate section 113 of the fluid passage 93. In this manner leakage of fluid, which would tend to pass the sealing ring 103, is kept to a minimum. While description has been made with respect to the valve mechanism for one of the fluid passages, it will be apparent that the valve mechanism for the opposite passage is of similar construction.

Each of the rotatable members 100 has operating arms 112, each of which has transversely extending portions 114 arranged in transverse alinement with respect to each other. The rotatable members carry a sleeve 115 from which there extends a pin 116. This pin serves as a means for stabilizing a coil spring 117 seated within a recess 118 of a single manually operable control element 119 having a handle portion 120 accessible to the operator's station 20. This element 119 is bifurcated at its lower end to fit about the sleeve 115 about which it is retained by means of pins 121. Intermediate the length of the control element 119, there is provided a slotted portion 122 arranged to receive the transversely extending portions 114 of the operating arms 112.

The control element 119 being so connected to the sleeve 115 can be moved or deflected laterally to one side or the other so that the transverse portion of one of the operating arms 112 will be relieved from the slotted portion 122 of the control element. This is illustrated by dotted lines in Figure 6, where the transversely extending portion 114 at the left is not included in the slotted portion 122. Assuming that the control element 119 has been moved to the position shown in dotted lines in Figure 6 and the same then pulled rearwardly by the operator guided by a slot 124 in a guiding frame 125 carried on the top of the housing 90, the ball valves at the right side of the mechanism 60 will be opened and fluid will pass through the passage 64 to the fluid-actuated device 48 at the right side of the tractor. At this time there is no operation of the valve-operating device located at the left side of the mechanism. The control element 119, being connected by means of the rod 66 to the manual control lever 65 of the manual control valve mechanism 25, will automatically cause a closing of the sleeve valve 75 so that fluid is diverted from the fluid passage 71 of the fluid mechanism 25 to the selective control mechanism 60, and at the same time the operating lever 79 is latched by the latch element 77 to retain the sleeve 75 in its closed position. After the working tools at the right side of the tractor have been raised, the throw-out mechanism will be operated and the control element 119 will be forcibly returned to its neutral position under the force of the spring 86a of the fluid power mechanism 25. On the guiding means 125 there is provided a stop 126 against which a projected portion 127 on the lever 119 will engage, thereby arresting the forward movement of the control element 119. With the control element 119 in its neutral position, the ball valves 96 and 97 are closed upon their seat portions. If it is desired to lower the working tools at the right side of the tractor, the control element 119 can be thrust forwardly in the slot 124 to simultaneously open the ball valve 96 and 97 and the ball valve 76 in the fluid power mechanism 25, the latter being effected by the element 87 on the operating lever 79 abutting with a pin 88. After the lowering operation, the control element 119 can be manually returned to its neutral position, the fluid having been returned from the fluid-actuated device at the right side of the tractor to the fluid reservoir housing 69.

Figures 9, 10, 11:
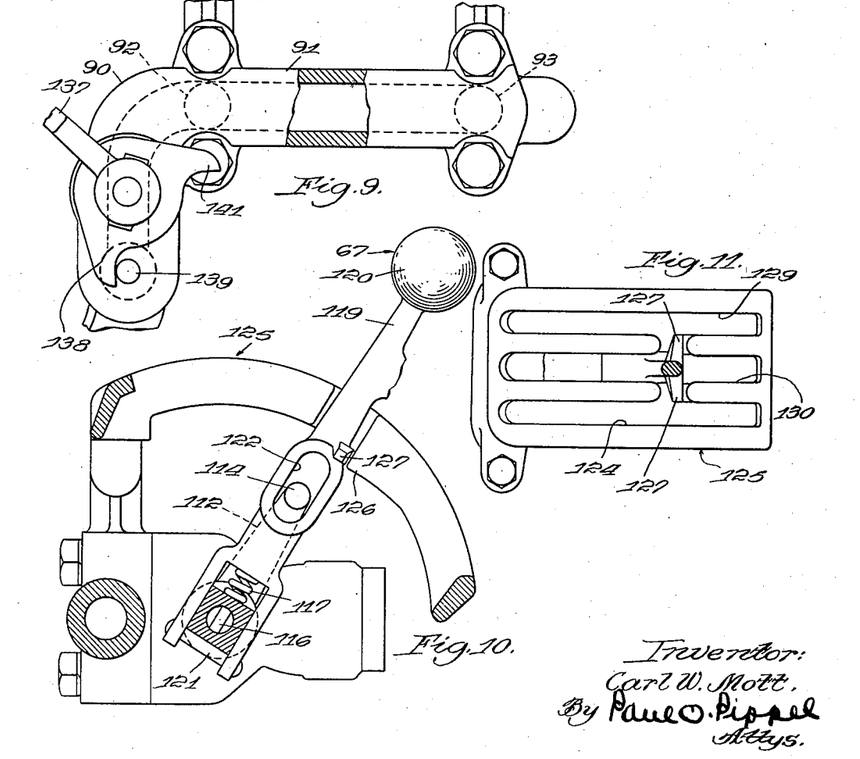
Figure 9 is a detail view of a throttle valve operating means located in position for lifting of the working tools from their working positions when the working tools are to be lifted and of a portion of a housing as viewed in elevation from the right side of the unit as shown in Figure 8.
Figure 10 is a view in elevation and in detail of the manually operable control element as taken along the line 10—10 of Figure 6.
Figure 11 is a top plan view of the means for guiding the manually operable control element.

Since there is a similar ball valve mechanism at the opposite side of the mechanism 60, it will now be apparent that the lever 119 might likewise be moved to the left to work in a slot 129 of the guiding means 125 to pick up the lever 112 at the left side of the device. By going through a similar operation, as just described, the working tools at the left side of the tractor can be raised and lowered.

There has been described the operation of the combined mechanism for the effecting of selective lifting of working tools at the opposite sides of the tractor. There will now be described the manner of operation for effecting by the same mechanism the collective operation of working tools located at both sides of the tractor. As viewed in Figure 11, it will be noted that there is provided a third and centrally disposed slot 130 into which the control element 119 can be guided. When the control element 119 is in this central position, its slotted portion retains both of the transversely extending portions 114 of the respective operating levers 112. Thus, upon rearward movement of the element 119 the valves at both sides of the mechanism 60 are operated simultaneously. Fluid then flows to both of the fluid-actuating devices on the opposite sides of the tractor, and all of the tools are raised at once. At the end of the raising stroke the element 119 will be similarly caused to return to its neutral position by means of the throw-out mechanism of the main control valve acting upon it until it bears against the stops 126 on the guiding means 125. Likewise, a forward movement in the slot 130 upon the neutral position can be effected and simultaneously lowering of the working tools on both sides of the tractor will be effected, the control element 119 being at all times connected with the main control lever 65 of the fluid power mechanism 25.

As a means for the control element 119 having the portions 127 for escaping the stop means 126, there has been provided the biasing spring 117 which permits a downward thrust of the lever 119 upon the operator depressing the same. Once the operating levers 112 have been positioned in their neutral position, they are there retained by depending deflector springs 132 carried by the sides of the guide plate 125 and adapted to receive and center the operating arms 112 as they are brought into their neutral position.

It should now be apparent that there has been provided a unit which serves as a means for converting a fluid power arrangement of a type adapted for simultaneous operation of working tools into a fluid power arrangement where either selective or simultaneous movement of working tools located at opposite sides of the tractor can be effected, and that this effect is accomplished by a single operating lever accessible to the operator's station on the tractor. It should also be apparent that this control mechanism is of a type which can be connected to the tractor as a unit and wherein only minimum effort is required for the attachment of the same with the usual fluid power arrangement.

Associated with this combined unit 60 is a throttle valve 133 having a small port 135 extending diametrically through the same in one direction and a large port 136 extending through the same at an angle of 90° with respect to the smaller port. This throttle valve element 133 is journaled in the housing 90 and can be turned through 90° by means of an operating handle 137 likewise accessible to the operator's station 20. Normally the operating lever 137 is in the position shown in Figure 9 with its lug portion 138 abutting a stop element 139 on the housing 90. With the throttle valve 133 turned to this position the large port 136 is alined with a vertically extending fluid passage 140 in the housing 90. When it is desired to effect adjustment of the working-tool rigs by power, the throttle valve 136 is turned by the operating handle 137 until a lug 141 thereon abuts the stop 139. When the throttle valve 133 is turned to this position, the small port 135 is then alined with the passage 140. This port 135 will cause fluid to pass through the passage 140 at a slower rate of speed. By the operator then utilizing the control element 119 in the manner already described, he may now effect a raising and lowering of the working tools at a much reduced rate of speed whereby a delicate adjustment of the working tools can be effected. During this operation the operator would continue to hold the handle 120 of the lever and when the working tools have reached the position desired, the same will be moved manually to their original neutral position. While the control handle is so held in the position for causing lifting adjustment of the tools at the slow speed just described, the pump will generally deliver more fluid than can pass through the small passage 135 at pressure not exceeding that at which the pressure relief valve 83, Figure 4, opens. Thus, normally the valve 83 opens permitting the fluid to lift the cap 85 and thereby lift the latch lever 77 to its unlatching position. This is not significant, because the operator can easily hold the lever 120 in the position to retain the by-pass valve sleeve in its closed position. Meanwhile the excess fluid delivered into the passage 71, Figure 4, is allowed to escape at high pressure through the valve 83, chamber 82, port 84, and thence through the space 85a between the then raised cap 85 and the outer periphery of the chamber 82 and back to the sump at the bottom of the housing 69.

It should thus now be apparent that there has been provided a throttle valve arrangement adapted for use with a fluid power arrangement wherein the power mechanism is rendered adaptable with minimum effort for use of the same as a means for adjusting the working tools by power. It should also be apparent that this ball valve arrangement forms a part of a combined collective and selective mechanism, and whereby the working tools may be adjusted either simultaneously, or the working tools at one side of the tractor may be adjusted independently of the working tools at the other side of the tractor. The need for a manually adjustable mechanism independently of the power mechanism for adjusting the working tools is no longer necessary.

While various changes may be made in the detail construction of the present invention, it is to be understood that such changes shall be within the spirit and scope of the present invention as defined by the appended claims.

What is claimed is:

1. In combination, a tractor, working tools located at opposite sides of the tractor and connected to the same for movement to and from their working positions, a fluid power arrangement adapted to be operated by the tractor and normally arranged for moving the working tools in a certain timed relation, said arrangement including fluid-actuated devices for the respective working tools, a main control valve operable from a throw-out position in which it causes no fluid delivery to said fluid power arrangement to an active position in which it causes fluid delivery at sufficient pressure to actuate the fluid-actuated devices, and a throw-out mechanism associated with the main control valve and operable to place the control valve in said throw-out position pursuant to the attainment of a certain movement by said tools, means for converting the said fluid arrangement into a fluid arrangement of a type having combined collective and selective control including selective valve means and a single manually operable element movable from a neutral position to selecting positions to condition said selective valve means for directing fluid from said arrangement to selected of the fluid-actuated devices and adapted to be connected to the said main control valve to operate the same to its active position and to be operated to the neutral position by the throw-out mechanism, and the said converting means being for attachment to the tractor as a unit.

2. In combination; a tool-supporting structure; working tools upon opposite sides of the tool-supporting structure for movement to and from their working positions; and a power energized system for producing controlled movement of the tools, comprising power-actuated means respectively connected to the tools and actuable to impart force thereto for incurring such movement, a power-transmitting medium variably subjectable to said power-actuated means for controlling the actuation thereof, and a control device for the power-transmitting medium, said device being operable to vary the subjection of said medium to either power-actuated means to determine the direction of movement of the tool connected therewith, said device also being settable to determine which power-actuated means will be actuated upon operation of the device, and said device including a control element manually manipulatable toward either side of the tool-supporting structure to select as aforesaid the power-actuated means connected with the tool at such side and being thereupon further manipulatable to cause operation of the control device to determine the direction of movement of such tool as aforesaid.

3. In combination; a tool-supporting structure; working tools upon opposite sides of the tool-supporting structure for movement to and from their working positions; and a power energized system for producing controlled movement of the tools, comprising power-actuated means respectively connected to the tools and actuatable to impart force thereto for incurring such movement, a power-transmitting medium variably subjectable to said power-actuated means for controlling the actuation thereof, and a control device for the power-transmitting medium, said device being operable to vary the subjection of said medium to said power-actuated means both singly and collectively to determine the direction of movement of the tools connected therewith, said device also being settable to select either or both of the power-actuated means for actuation upon operation of said device, and said device including a control element manually manipulatable between a neutral position and positions disposed therefrom toward opposite sides of the tool-supporting structure to select as aforesaid respectively both of the power-actuated means or the one thereof connected with the tool at the side toward which the element is moved, and said control element being further manipulatable at each of said positions to cause said device to determine the direction of movement of the selected tool or tools.

4. The combination set forth in claim 2, wherein said further manipulation of the control element corresponds in direction generally to that in which the tools are moved as a consequence of such further manipulation whereby the control element incurs tool selection and movement in accord with muscular reflex response of an operator.

5. In combination; a vehicular tool-supporting structure; working tools upon opposite sides of said structure for raising and lowering movement from and to respective working positions; and a power energized system for producing controlled movement of the tools, comprising power-actuated means respectively connected to the tools and actuatable to impart force thereto for incurring such movement, a power-transmitting medium variably subjectable to said power-actuated means for controlling the actuation thereof, and control apparatus for the power-transmitting medium, said control apparatus being operable to vary the subjection of said medium to either power-actuated means to determine whether raising or lowering movement will be imparted to the tool connected therewith, said control apparatus also being settable to determine which power-actuated means will be actuated upon the operation of said apparatus, said control apparatus including a control element manipulatable from an intermediate position toward either side of the tool-supporting structure to select as aforesaid the power-actuated means connected at such side and being thereupon further manipulatable generally upwardly or downwardly to cause operation of the control apparatus to respectively determine raising or lowering movement of such tool as aforesaid.

6. In combination; a vehicular tool-supporting structure; working tools upon opposite sides of said structure for raising and lowering movement from and to respective working positions; and a power energized system for producing controlled movement of the tools, comprising power-actuated means respectively connected to the tools and actuatable to impart force thereto for incurring such movement, a power-transmitting medium variably subjectable to said power-actuated means for controlling the actuation thereof, and control apparatus for the power-transmitting medium, said control apparatus being operable to vary the subjection of said medium to either power-actuated means to determine whether raising or lowering movement will be imparted to the tool connected therewith, said control apparatus also being settable to determine which power-actuated means will be actuated upon the operation of said apparatus, said control apparatus including a control element manipulatable from an intermediate position toward either side of the tool-supporting structure to select as aforesaid the power-actuated means connected at such side and being thereupon further manipulatable generally backwardly or forwardly to cause operation of the control apparatus to respectively determine raising or lowering movement of such tool as aforesaid.

7. In combination, a tool-supporting structure, a working tool connected to the tool-supporting structure for adjustment with respect thereto, a fluid motor actuatable at a speed that is a function of the delivery rate of fluid thereto to adjust said tool, a fluid pump having a fluid outlet, a conduit for delivery of fluid from the pump outlet to said motor, throttle means in said conduit to modify the rate at which fluid is deliverable therethrough to the motor, and pressure relief valve means in communication with the pump outlet to discharge fluid pumped from the pump outlet upon a predetermined increase of pressure in the conduit, between the pump outlet and throttle means, incurred by the latter throttling the flow rate to the motor.

8. In combination; a vehicular tool-supporting structure; a plurality of tools adjustably connected to said structure; fluid motors energizable when subjected to fluid under sufficient pressure to move said tools singly or in concert according to selection in energization of said motors; a source for fluid at said pressure; and a delivery system for subjecting the motors to fluid at said pressure from said source, comprising a control valve unit operable to control delivery of fluid in the system under said pressure, a selector valve unit including a control member manipulatable from a neutral position into positions for selectively subjecting the motors to the pressure of fluid in said system, a connection between said control member and the main control valve unit to operate the latter for causing the delivery of fluid at said pressure in the system concurrently with manipulation of the control member into its said selecting positions, and means operable pursuant to the attainment of a predetermined adjustment of the tools by said motors to effect additional operation of the main control valve unit for terminating fluid delivery into the system at said pressure, and said connection being further operable to move the control member of the selector valve unit to the neutral position concurrently with said additional operation of the main control valve unit.

9. In combination; a vehicular tool-supporting structure; a plurality of tools adjustably connected to said structure; fluid motors energizable when subjected to fluid under sufficient pressure to move said tools singly or in concert according to selection in energization of said motors; a pump for said fluid; and a delivery system for subjecting the motors to fluid from the pump at said pressure, comprising a control valve unit operable to by-pass fluid from the pump and closable to direct such fluid into the system to create said pressure therein, a selector valve unit including a control member manipulatable from a neutral position into positions for selectively subjecting the motors to the pressure of fluid in said system, a force-transmitting connection between said control member and the main control valve unit to close the latter incident to movement of said control member into its selecting positions, means responsive to a predetermined pressure of the fluid in said system for opening the main valve, means releasably maintaining said fluid in pressure-subjection relation with the energized of said motors after the opening of the main valve, and said force-transmitting connection being further operable to move the control member of the selector valve unit to the neutral position concurrently with the opening of the main valve unit.

CARL W. MOTT.